United States Patent
Yigzaw et al.

(10) Patent No.: US 10,185,619 B2
(45) Date of Patent: Jan. 22, 2019

(54) HANDLING OF ERROR PRONE CACHE LINE SLOTS OF MEMORY SIDE CACHE OF MULTI-LEVEL SYSTEM MEMORY

(71) Applicant: INTEL CORPORATION, Santa Clara, CA (US)

(72) Inventors: Theodros Yigzaw, Sherwood, OR (US); Ashok Raj, Portland, OR (US); Robert Swanson, Olympia, WA (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 15/087,797

(22) Filed: Mar. 31, 2016

(65) Prior Publication Data
US 2017/0286210 A1 Oct. 5, 2017

(51) Int. Cl.
*G06F 11/07* (2006.01)
*G06F 12/0804* (2016.01)

(52) U.S. Cl.
CPC ........ *G06F 11/0793* (2013.01); *G06F 11/073* (2013.01); *G06F 11/079* (2013.01); *G06F 11/0751* (2013.01); *G06F 12/0804* (2013.01); *G06F 2212/1021* (2013.01); *G06F 2212/1032* (2013.01); *G06F 2212/22* (2013.01)

(58) Field of Classification Search
CPC ............... G06F 11/073; G06F 11/0793; G06F 11/1048; G06F 11/1072
USPC ........................................................ 714/6.11
See application file for complete search history.

(56) References Cited

U.S. PATENT DOCUMENTS

| | | | |
|---|---|---|---|
| 5,666,482 | A | 9/1997 | McClure |
| 5,912,839 | A | 6/1999 | Ovshinsky et al. |
| 6,035,432 | A | 3/2000 | Jeddeloh |
| 6,292,874 | B1 | 9/2001 | Barnett |
| 7,590,918 | B2 | 9/2009 | Parkinson |
| 7,600,078 | B1 | 10/2009 | Cen et al. |
| 7,756,053 | B2 | 7/2010 | Thomas et al. |
| 7,913,147 | B2 | 3/2011 | Swaminathan et al. |

(Continued)

FOREIGN PATENT DOCUMENTS

| | | |
|---|---|---|
| CN | 1100540 A | 3/1995 |
| CN | 101079003 A | 11/2007 |

(Continued)

OTHER PUBLICATIONS

"The Non-Volatile Systems Laboratory Coding for non-volatile memories", http://nvsl.ucsd.edu/ecc, printed Sep. 1, 2011. 2 pgs.

(Continued)

*Primary Examiner* — Chae M Ko
(74) *Attorney, Agent, or Firm* — Compass IP Law PC

(57) ABSTRACT

An apparatus is described that includes memory controller logic circuitry to interface with a memory side cache of a multi-level system memory. The memory controller logic circuitry includes error tracking circuitry to track errors of cache line slots in the memory side cache. The memory controller logic circuitry also comprises faulty list circuitry to store identifiers of faulty cache line slots that are deemed to be excessively error prone. The memory controller logic circuitry is to declare a miss in the memory side cache for requests that map to cache line slots identified in the faulty list.

14 Claims, 4 Drawing Sheets

(56) References Cited

U.S. PATENT DOCUMENTS

| | | |
|---|---|---|
| 8,051,253 B2 | 11/2011 | Okin et al. |
| 8,462,537 B2 | 6/2013 | Karpov et al. |
| 8,462,577 B2 | 6/2013 | Zeng et al. |
| 8,463,948 B1 | 6/2013 | Qawami et al. |
| 8,605,531 B2 | 12/2013 | Kau |
| 8,607,089 B2 | 12/2013 | Qawami et al. |
| 8,612,676 B2 | 12/2013 | Dahlen et al. |
| 8,612,809 B2 | 12/2013 | Casper et al. |
| 8,626,997 B2 | 1/2014 | Qawami et al. |
| 8,649,212 B2 | 2/2014 | Kau et al. |
| 8,838,935 B2 | 9/2014 | Hinton et al. |
| 9,342,453 B2 | 5/2016 | Nale et al. |
| 9,378,133 B2 | 6/2016 | Nachimuthu et al. |
| 9,430,372 B2 | 8/2016 | Nachimuthu et al. |
| 2003/0131277 A1* | 7/2003 | Taylor ............... G06F 11/1064 714/5.1 |
| 2005/0216667 A1* | 9/2005 | Cabot ............... G06F 12/0802 711/118 |
| 2006/0031708 A1* | 2/2006 | Desai ............... G06F 12/0897 714/5.1 |
| 2007/0005922 A1 | 1/2007 | Swaminathan et al. |
| 2007/0260821 A1* | 11/2007 | Zeffer ............... G06F 12/0815 711/143 |
| 2008/0016269 A1 | 1/2008 | Chow et al. |
| 2008/0034148 A1 | 2/2008 | Gower et al. |
| 2008/0082766 A1 | 4/2008 | Okin et al. |
| 2008/0168233 A1 | 7/2008 | Luc et al. |
| 2008/0270811 A1 | 10/2008 | Chow et al. |
| 2009/0119498 A1 | 5/2009 | Narayanan |
| 2009/0164727 A1* | 6/2009 | Penton ............... G06F 11/1064 711/118 |
| 2009/0300413 A1 | 12/2009 | Chang et al. |
| 2009/0313416 A1 | 12/2009 | Nation |
| 2010/0082905 A1* | 4/2010 | Wilkerson ............ G06F 1/3203 711/122 |
| 2010/0088550 A1* | 4/2010 | Imai ............... G11C 29/808 714/42 |
| 2010/0110748 A1 | 5/2010 | Best |
| 2010/0131812 A1* | 5/2010 | Mohammad ............ G11C 29/44 714/723 |
| 2010/0131827 A1 | 5/2010 | Sokolov et al. |
| 2010/0268984 A1* | 10/2010 | Guthrie ............... G06F 11/0724 714/5.11 |
| 2010/0291867 A1 | 11/2010 | Abdulla et al. |
| 2010/0293317 A1 | 11/2010 | Confalonieri et al. |
| 2010/0306446 A1 | 12/2010 | Villa et al. |
| 2010/0306453 A1 | 12/2010 | Doller |
| 2010/0318718 A1 | 12/2010 | Eilert et al. |
| 2011/0047365 A1 | 2/2011 | Hentosh et al. |
| 2011/0047411 A1* | 2/2011 | Gille ............... G06F 11/073 714/723 |
| 2011/0153916 A1 | 6/2011 | Chinnaswamy et al. |
| 2011/0208900 A1 | 8/2011 | Schuette et al. |
| 2011/0219208 A1* | 9/2011 | Asaad ............... G06F 15/76 712/12 |
| 2011/0291884 A1 | 12/2011 | Oh et al. |
| 2013/0007358 A1* | 1/2013 | Hu ............... G06F 12/0846 711/108 |
| 2013/0232377 A1* | 9/2013 | Kakihara ............... G11C 29/72 714/6.13 |
| 2013/0275661 A1 | 10/2013 | Zimmer et al. |
| 2013/0282967 A1 | 10/2013 | Ramanujan |
| 2013/0290597 A1 | 10/2013 | Faber |
| 2014/0108733 A1* | 4/2014 | Wilkerson ............ G06F 1/3243 711/122 |
| 2014/0129767 A1 | 5/2014 | Ramanujan et al. |
| 2014/0297938 A1 | 10/2014 | Puthiyedath et al. |
| 2014/0344641 A1* | 11/2014 | Jeong ............... G06F 11/073 714/759 |
| 2015/0106569 A1* | 4/2015 | Cordero ............... G06F 11/00 711/132 |
| 2015/0261681 A1* | 9/2015 | Craddock ............ G06F 13/16 711/122 |
| 2016/0004639 A1 | 1/2016 | Vorbach |
| 2016/0041772 A1 | 2/2016 | Dahlen et al. |

FOREIGN PATENT DOCUMENTS

| | | |
|---|---|---|
| CN | 101620539 B | 12/2013 |
| JP | 04326436 A * | 11/1992 |
| WO | 2005002060 A2 | 1/2005 |

OTHER PUBLICATIONS

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

Akel et al., "Onyx: A Prototype Phase Change Memory Storage Array," https://www.flashmemorysummit.com/English/Collaterals/Proceedings/2011/Pr- oceedings.sub.--Chrono.sub.--2011.html, Flash Memory Summit 2011 Proceedings, Aug. 11, 2011.

Bailey et al., "Operating System Implications of Fast, Cheap, Non-Volatile Memory" 13th USENIX, HOTOS11 2011, May 9-11, 2011, 5 pages.

Caulfield et al., "Moneta: A High-performance Storage Array Architecture for Next-generation, Non-volatile Memories", Micro 43: Proceedings of the 43rd Annual IEEE/ACM International Symposium on Microarchitecture, Atlanta, GA Dec. 2010 pp. 385-395.

Chen et al., "Rethinking Database Algorithms for Phase Change Memory", 5th Biennial Conference on Innovative Data Systems Research {CIDR '11 }, Jan. 9, 2011, 11 pgs., Asilomar, California, USA.

Condit et al., "Better I/0 Through Byte-Addressable, Persistent Memory", SOSP '09, Oct. 11, 2009, pp. 133-146. Big Sky, Montana, USA.

Dhiman et al., "PDRAM: A Hybrid PRAM and DRAM Main Memory System," Department of Computer Science and Engineering, 6 pages, Jul. 26, 2009.

Freitas et al., "Storage-class memory: The next storage system technology," IBM Journal of Research and Development, vol. 52, Issue 4.5, pp. 438-447, Jul. 2008.

Jacob, "The Memory System You Can't Avoid It, You Can't Ignore It, You Can't Fake It," Morgan & Claypool, Synthesis Lectures on Computer Architecture, vol. 4, No. 1, pp. 1-77, Jun. 2009.

Kant, Dr. Krishna, "Exploiting NVRAM for Building Multi-Level Memory Systems", InternationalWorkshop on Operating System Technologies for Large Scale NVRAM, Oct. 21, 2008, Jeju, Korea, 19 pages.

Lee et al., "Architecting Phase Change Memory as a Scalable DRAM Alternative", ISCA '09, Jun. 20, 2009, 12 pgs., Austin, Texas, USA.

Mearian, "IBM announces computer memory breakthrough Phase-change memory offers 100 times the write performance of NANO flash", Jun. 30, 2011, 3 pgs.

Mogul et al., "Operating System Support for NVM+DRAM Hybrid Main Memory", 12th Workshop on Hot Topics in Operating Systems {HatOS XII), May 18, 2009, 9 pgs.

Phase Change Memory-Based 'Moneta' System Points to the Future of Computer Storage, ScienceBlog, Jun. 3, 2011, 7 pgs.

Quereshi et al., "Scalable High Performance Main Memory System Using Phase-Change Memory Technology", ISCA '09, Jun. 20, 2009, 10 pgs., Austin, Texas, USA.

Raoux et al., "Phase-Change Random Access Memory: A Scalable Technology," IBM Journal of Research and Development, vol. 52, Issue 4, pp. 465-479, Jul. 2008.

Wu et al., "eNVy: A Non-Volatile, Main Memory Storage System," ASPLOS VI Proceedings of the Sixth International Conference on Architectural Support for Programming Languages and Operating Systems, 12 pages, Oct. 1994.

(56) References Cited

OTHER PUBLICATIONS

International Search Report and Written Opinion for PCT Patent Application No. PCT/US2017/013442, dated May 8, 2017, 12 pages.

* cited by examiner

HANDLING OF ERROR PRONE CACHE LINE SLOTS OF MEMORY SIDE CACHE OF MULTI-LEVEL SYSTEM MEMORY

FIELD OF INVENTION

The field of invention pertains generally to the computing sciences, and, more specifically, to the handling of error prone cache line slots of a memory side cache of a multi-level system memory.

BACKGROUND

Computing systems typically include a system memory (or main memory) that contains data and program code of the software code that the system's processor(s) are currently executing. A pertinent issue in many computer systems is the system memory. Here, as is understood in the art, a computing system operates by executing program code stored in system memory. The program code when executed reads and writes data from/to system memory. As such, system memory is heavily utilized with many program codes and data reads as well as many data writes over the course of the computing system's operation. Finding ways to improve system memory is therefore a motivation of computing system engineers.

FIGURES

A better understanding of the present invention can be obtained from the following detailed description in conjunction with the following drawings, in which.

DETAILED DESCRIPTION

1.0 Multi-Level System Memory

1.a. Multi-Level System Memory Overview

Figure 1:
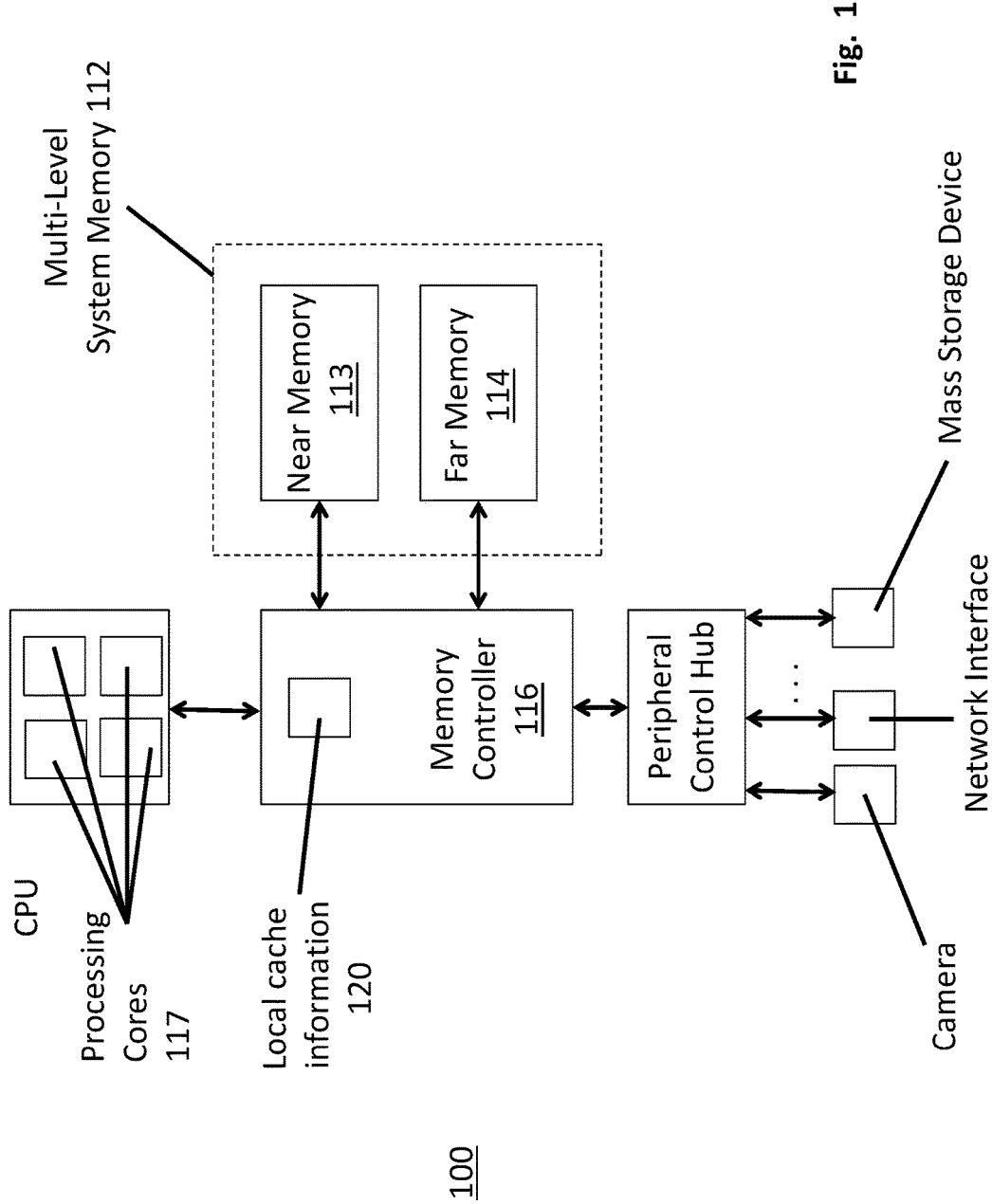
FIG. 1 shows a computing system having a multi-level system memory.

One of the ways to improve system memory performance is to have a multi-level system memory. FIG. 1 shows an embodiment of a computing system 100 having a multi-tiered or multi-level system memory 112. According to various embodiments, a smaller, faster near memory 113 may be utilized as a cache for a larger far memory 114.

The use of cache memories for computing systems is well-known. In the case where near memory 113 is used as a cache, near memory 113 is used to store an additional copy of those data items in far memory 114 that are expected to be more frequently called upon by the computing system. The near memory cache 113 has lower access times than the lower tiered far memory 114 region. By storing the more frequently called upon items in near memory 113, the system memory 112 will be observed as faster because the system will often read items that are being stored in faster near memory 113. For an implementation using a write-back technique, the copy of data items in near memory 113 may contain data that has been updated by the CPU, and is thus more up-to-date than the data in far memory 114. The process of writing back 'dirty' cache entries to far memory 114 ensures that such changes are not lost.

According to some embodiments, for example, the near memory 113 exhibits reduced access times by having a faster clock speed than the far memory 114. Here, the near memory 113 may be a faster (e.g., lower access time), volatile system memory technology (e.g., high performance dynamic random access memory (DRAM)) and/or SRAM memory cells co-located with the memory controller 116. By contrast, far memory 114 may be either a volatile memory technology implemented with a slower clock speed (e.g., a DRAM component that receives a slower clock) or, e.g., a non volatile memory technology that may be slower (e.g., longer access time) than volatile/DRAM memory or whatever technology is used for near memory.

For example, far memory 114 may be comprised of an emerging non volatile random access memory technology such as, to name a few possibilities, a phase change based memory, three dimensional crosspoint memory device, or other byte addressable nonvolatile memory devices, "write-in-place" non volatile main memory devices, memory devices that use chalcogenide phase change material (e.g., glass), single or multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc.

Such emerging non volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging non volatile memory technologies to be used in a main system memory role rather than a traditional mass storage role (which is the traditional architectural location of non volatile storage).

Regardless of whether far memory 114 is composed of a volatile or non volatile memory technology, in various embodiments far memory 114 acts as a true system memory in that it supports finer grained data accesses (e.g., cache lines) rather than larger based accesses associated with traditional, non volatile mass storage (e.g., solid state drive (SSD), hard disk drive (HDD)), and/or, otherwise acts as an (e.g., byte) addressable memory that the program code being executed by processor(s) of the CPU operate out of. However, far memory 114 may be inefficient when accessed for a small number of consecutive bytes (e.g., less than 128 bytes) of data, the effect of which may be mitigated by the presence of near memory 113 operating as cache which is able to efficiently handle such requests.

Because near memory 113 acts as a cache, near memory 113 may not have formal addressing space. Rather, in some cases, far memory 114 defines the individually addressable memory space of the computing system's main memory. In various embodiments near memory 113 acts as a cache for far memory 114 rather than acting a last level CPU cache. Generally, a CPU cache is optimized for servicing CPU transactions, and will add significant penalties (such as cache snoop overhead and cache eviction flows in the case of hit) to other memory users such as Direct Memory Access (DMA)-capable devices in a Peripheral Control Hub. By contrast, a memory side cache is designed to handle all accesses directed to system memory, irrespective of whether they arrive from the CPU, from the Peripheral Control Hub, or from some other device such as display controller.

For example, in various embodiments, system memory is implemented with dual in-line memory module (DIMM) cards where a single DIMM card has both volatile (e.g., DRAM) and (e.g., emerging) non volatile memory semiconductor chips disposed in it. The DRAM chips effectively act as an on board cache for the non volatile memory chips on the DIMM card. Ideally, the more frequently accessed cache lines of any particular DIMM card will be accessed from that DIMM card's DRAM chips rather than its non volatile memory chips. Given that multiple DIMM cards may be plugged into a working computing system and each DIMM card is only given a section of the system memory addresses made available to the processing cores 117 of the semiconductor chip that the DIMM cards are coupled to, the DRAM chips are acting as a cache for the non volatile memory that they share a DIMM card with rather than a last level CPU cache.

In other configurations DIMM cards having only DRAM chips may be plugged into a same system memory channel (e.g., a DDR channel) with DIMM cards having only non volatile system memory chips. Ideally, the more frequently used cache lines of the channel are in the DRAM DIMM cards rather than the non volatile memory DIMM cards. Thus, again, because there are typically multiple memory channels coupled to a same semiconductor chip having multiple processing cores, the DRAM chips are acting as a cache for the non volatile memory chips that they share a same channel with rather than as a last level CPU cache.

In yet other possible configurations or implementations, a DRAM device on a DIMM card can act as a memory side cache for a non volatile memory chip that resides on a different DIMM and is plugged into a different channel than the DIMM having the DRAM device. Although the DRAM device may potentially service the entire system memory address space, entries into the DRAM device are based in part from reads performed on the non volatile memory devices and not just evictions from the last level CPU cache. As such the DRAM device can still be characterized as a memory side cache.

In another possible configuration, a memory device such as a DRAM device functioning as near memory 113 may be assembled together with the memory controller 116 and processing cores 117 onto a single semiconductor device or within a same semiconductor package. Far memory 114 may be formed by other devices, such as slower DRAM or non-volatile memory and may be attached to, or integrated in that device.

As described at length above, near memory 113 may act as a cache for far memory 114. In various embodiments, the memory controller 116 and/or near memory 213 may include local cache information (hereafter referred to as "Metadata") 120 so that the memory controller 116 can determine whether a cache hit or cache miss has occurred in near memory 113 for any incoming memory request. The metadata may also be stored in near memory 113.

In the case of an incoming write request, if there is a cache hit, the memory controller 116 writes the data (e.g., a 64-byte CPU cache line) associated with the request directly over the cached version in near memory 113. Likewise, in the case of a cache miss, in an embodiment, the memory controller 116 also writes the data associated with the request into near memory 113, potentially first having fetched from far memory 114 any missing parts of the data required to make up the minimum size of data that can be marked in Metadata as being valid in near memory 113, in a technique known as 'underfill'. However, if the entry in the near memory cache 113 that the content is to be written into has been allocated to a different system memory address and contains newer data than held in far memory 114 (i.e. it is dirty), the data occupying the entry must be evicted from near memory 113 and written into far memory 114.

In the case of an incoming read request, if there is a cache hit, the memory controller 116 responds to the request by reading the version of the cache line from near memory 113 and providing it to the requestor. By contrast, if there is a cache miss, the memory controller 116 reads the requested cache line from far memory 114 and not only provides the cache line to the requestor but also writes another copy of the cache line into near memory 113. In many cases, the amount of data requested from far memory 114 and the amount of data written to near memory 113 will be larger than that requested by the incoming read request. Using a larger data size from far memory or to near memory increases the probability of a cache hit for a subsequent transaction to a nearby memory location.

In general, cache lines may be written to and/or read from near memory and/or far memory at different levels of granularity (e.g., writes and/or reads only occur at cache line granularity (and, e.g., byte addressability for writes/or reads is handled internally within the memory controller), byte granularity (e.g., true byte addressability in which the memory controller writes and/or reads only an identified one or more bytes within a cache line), or granularities in between.) Additionally, note that the size of the cache line maintained within near memory and/or far memory may be larger than the cache line size maintained by CPU level caches.

Different types of near memory caching implementation possibilities exist. The sub-sections below describe exemplary implementation details for two of the primary types of cache architecture options: direct mapped and set associative. Additionally, other aspects of possible memory controller 116 behavior are also described in the immediately following sub-sections.

1.b. Direct Mapped Near Memory Cache

In a first caching approach, referred to as direct mapped, the memory controller 116 includes logic circuitry to map system addresses to cache line slots in near memory address space based on a portion of the system memory address. For example, in an embodiment where the size of near memory 113 corresponds to 16,777,216 cache line slots per memory channel, which in turn corresponds to a 24 bit near memory address size (i.e., $2^{24}$=16,777,216) per memory channel, 24 upper ordered bits of a request's system memory address are used to identify which near memory cache line slot the request should map to on a particular memory channel (the lower ordered bits specify the memory channel). For instance, bits A[5:0] of system memory address A identify which memory channel is to be accessed and bits A[29:6] of the system memory address identify which of 16,777,216 cache line slots on that channel the address will map to.

Additionally, upper ordered bits that are contiguous with the cache slot identification bits are recognized as a tag data structure used for identifying cache hits and cache misses. Here, different tags for a same set of bits A[29:6] map to a same cache line slot. For instance, in an embodiment, the next group of four upper ordered bits A[33:30] are recognized as a tag structure used to define 16 unique cache line addresses that map to a particular cache line slot.

The local cache information 120 therefore identifies which tag is currently being stored in each of the near memory cache line slots. Thus, when the memory controller 116 receives a memory write request, the memory controller maps bits A[29:6] to a particular slot in its local cache information 120. A cache hit results if the tag that is kept in local information 120 for the cache line slot that the request address maps to matches the tag of the request address (i.e., the cache line kept in near memory for this slot has the same system memory address as the request). Otherwise a cache miss has occurred. When the memory controller 116 writes a cache line to near memory after a cache miss, the memory controller stores the tag of the address for the new cache line being written into near memory into its local cache information for the slot so that it can test for a cache hit/miss the next time a request is received for an address that maps to the slot.

The local cache information 120 also includes a dirty bit for each cache line slot that indicates whether the cached version of the cache line in near memory 113 is the only copy of the most up to date data for the cache line. For example, in the case of a cache hit for a memory write request, the direct overwrite of the new data over the cached data without a write-through to far memory 114 will cause the dirty bit to be set for the cache line slot. Cache lines that are evicted from near memory 113 cache that have their dirty bit set are written back to far memory 114 but those that do not have their dirty bit set are not written back to far memory 114.

A valid data bit may also be kept for each cache line slot to indicate whether the version of the cache line kept in the near memory cache line slot is valid. Certain operational circumstances may result in a cache line in near memory being declared invalid. The memory controller is free to directly overwrite the cache line in near memory that is marked invalid even if the cache line overwriting it has a different tag. Generally, when a cache line is called up from far memory 114 and written into near memory 113 its valid bit is set (to indicate the cache line is valid).

1.c. Set Associative Near Memory Cache

In another approach, referred to as set associative, the memory controller includes hashing logic that performs a hash operation on the system memory address of an incoming system memory access request. The output of the hashing operation points to a "set" of entries in near memory cache where the cache line having the system memory address can be stored in the cache. In this approach, the memory controller keeps in its local cache information 120 a local set cache record that identifies, for each set of the cache, which system memory addresses are currently stored in the respective set and whether the set is full.

The local keeping of the system memory addresses permits the memory controller 116 to locally identify cache hits/misses internally to the memory controller 116. Locally tracking which sets are full also identifies to the memory controller 116 when a cache eviction is necessary. For instance, if a new memory request is received for a cache line whose system memory address maps to a set that is currently full, the memory controller will write the cache line associated with the newly received request into the set and evict one of the cache lines that is resident according to some eviction policy (e.g., least recently used, least frequently used, etc.). The memory controller may also locally keep meta data in the local cache information 120 that tracks the information needed to implement the eviction policy.

When a cache miss occurs for a write request that maps to a full set, the new cache line associated with the request is written into near memory cache and a cache line that is resident in the set is evicted to far memory if it is dirty. When a cache miss occurs for a read request that maps to a full set, the requested cache line associated with the request is read from far memory and written into near memory cache. A cache line that is resident in the set is evicted to far memory if it is dirty. Dirty bits and valid bits can also be kept for each cached cache line and used as described above.

1.d. Other Caches

As alluded to above other types of caching schemes may be applied for near memory. One possible alternative approach is where near memory is implemented as a fully associative cache. In this case, the cache is viewed as one large set that all system memory address map to. With this qualification, operations are the same/similar to those described just above. Additionally, rather than act as a memory side cache, near memory may instead be implemented as a last level CPU cache.

1.e. Near Memory Cache Scrubbing

At various ensuing intervals, the memory controller may scroll through its local cache information 120 and write a copy of those of the cache lines in near memory cache 113 whose corresponding dirty bit is set. Alternatively, e.g., if local cache information 120 is not resident, the near memory controller 120 may periodically read cache lines from near memory 113 and write those having their dirty bit set back to far memory 114 and rewrite a copy of the same back to near memory 113 but with their respective dirty bit being cleared. The "scrubbing" of the dirty near memory content back to far memory results in far memory increasing its percentage of the most recent data for the system's corresponding cache lines. As part of the scrubbing process, any cache line in near memory having a copy written back to far memory has its dirty bit cleared in the local cache information.

2.0 Robust Error Management in a Two Level Memory (2LM) System

As is known in the art, data stored in a memory system includes not only the random customer data of the system but also error correction code (ECC) information. Upon data being read from a memory, an ECC value is calculated from the read data and compared to the ECC information that was stored with the read data. Discrepancies between the newly calculated ECC information and the ECC information that was stored with the data is resolved to correct any errors in the data that was read from the memory.

The error rates of virtual memory addresses within a system memory are monitored and any virtual memory address that exhibits an excessive rate of errors (even if all such errors are corrected via ECC information) is "flagged" and directed to a new, different physical address. Here, as is understood in the art, a computing system will internally convert virtual addresses that are called out by operating software into specific physical addresses within the actual physical system memory resources.

If data read from a particular virtual memory address exhibits an excessive error rate (e.g., beyond a pre-set bit error rate criteria), the virtual memory address may be mapped, e.g., to a different physical memory address on the same memory chip that the virtual address originally mapped to. Here, for instance, spare memory space is resident on the memory chip. The spare memory space is utilized in case a particular data cell on the same chip begins to exhibit excessive errors. From the system perspective, the system remaps the virtual address from the physical address where the errors were observed to a new physical address within the spare memory space of the memory chip.

Error rates can also be monitored for an entire memory chip (by calculating a cumulative rate for all addresses that map to the chip). If the chip exhibits an excessive error rate the virtual addresses that map to that chip can be mapped to a different, spare memory chip within the memory system. Likewise, error rates and sparing can be performed at even higher levels. For example, error rates can be calculated for an entire DIMM card (by calculating a cumulative error rate for all addresses that map to that DIMM). If the error rate exceeds some threshold (e.g., beyond a pre-defined bit error rate) all virtual addresses that map the DIMM card may be remapped to a different, spare DIMM card that has been disposed into the memory system.

If a read request for a particular cache line is received at a system memory controller, the cache line's address is mapped to its corresponding address in near memory. A determination is then made whether the cache line at the address in near memory contains the data for the address of the read request. If so, a hit in near memory will be deemed to exist. If not, a miss will be recognized at near memory causing a read of the requested cache line from far memory. In the case of a write request, if a hit is recognized in near memory cache, in an embodiment, the smaller cache line that was received with the write request is written over itself within near memory.

Problems with respect to internal memory error management processes can arise in systems where a single near memory cache line maps to many cache lines in far memory. For example, in a system having a direct mapped cache where the capacity of far memory greatly exceeds the capacity of near memory, a single cache line slot (or "entry") in near memory is used to provide caching services for many different far memory addresses. In this environment, a 2LM system may associate errors with a cache line slot to all of the far memory addresses that the cache line slot supports. So doing may improperly amplify the true error rate of the memory by, e.g., a factor equal to the number of cache lines within far memory that the cache line slot supports.

For example, if a near memory controller determines that a cache line slot is exhibiting excessive errors it might cause the system to declare that all of the system memory addresses in far memory that the problematic cache line supports are problematic. For example, if a number of memory access requests having system memory addresses supported by the problematic cache line are not adequately serviced (or serviced at all), an operating system instance may associate the failure to serve the requests as a major system memory failure. If the system effectively tracks the number of cache lines that are declared problematic and is further designed to declare a major system failure if the number of such problematic cache lines exceed some threshold, a major system failure may be prematurely declared because of the aforementioned amplification effect in which all far memory system memory addresses supported by an error prone cache line slot are implicated as being problematic.

For example, an application software program, operating system, operating system instance or virtual machine monitor may recognize that a large number of the cache lines that it uses have been declared problematic and may issue a major alert in response.

Figure 2:
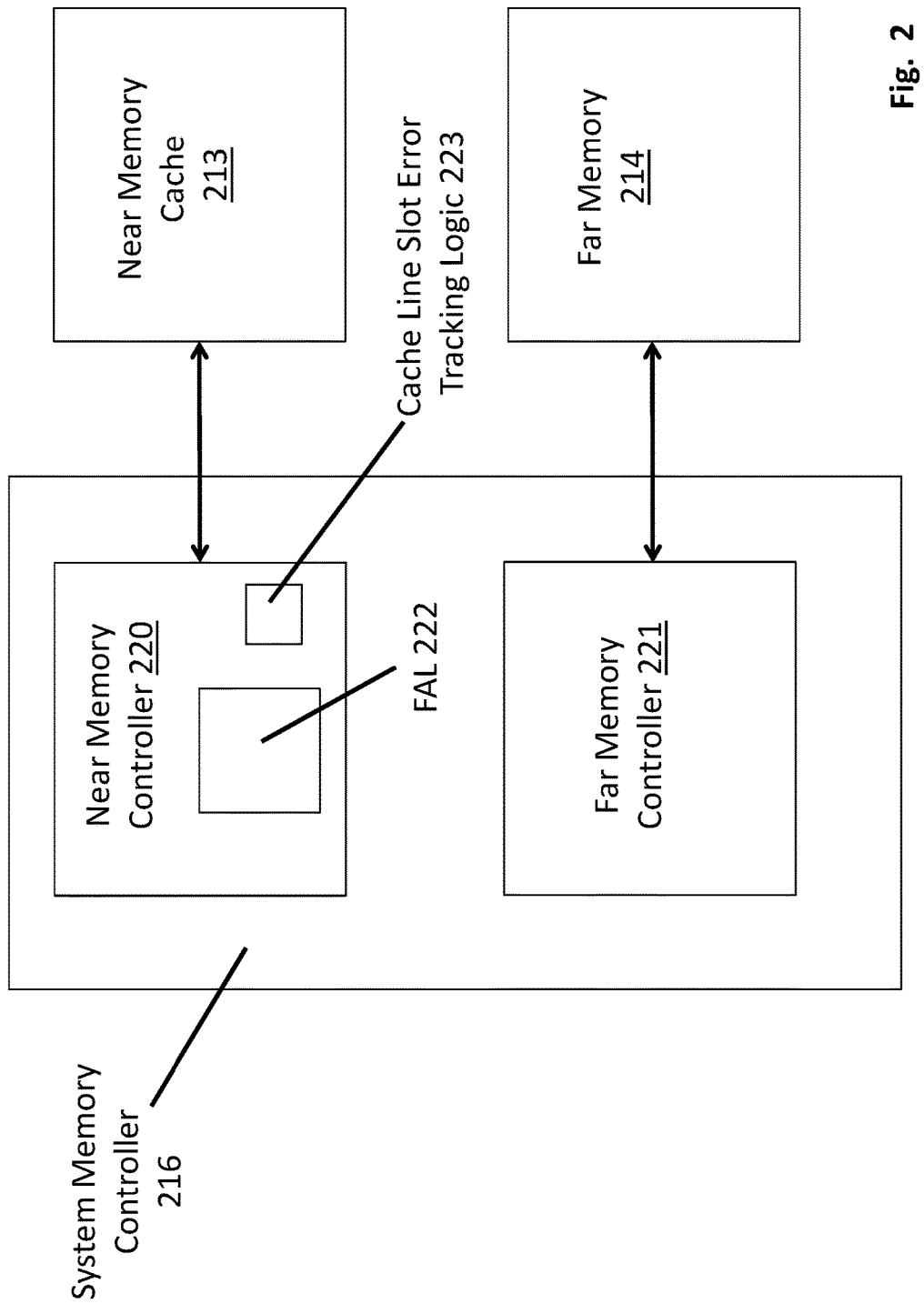
FIG. 2 shows an improved system memory controller having a faulty address list within a near memory controller.

FIG. 2 shows an improved system memory controller 216 that includes a Faulty Address List (FAL) 222 and cache line slot error tracking logic circuitry 223 within the near memory controller 220. The FAL 222 stores the addresses of those cache line slots that have exhibited an excessive error rate (in another embodiment, both the address and data in the FAL may be kept in a local cache that provides hit/miss information and the data for the faulty addresses). The cache line slot error tracking logic circuitry 223 monitors the error propensity of the slots in near memory cache 213 and determines when a particular slot has exhibited enough errors and/or exceeded an error rate sufficient to have its address added to the FAL 222.

If a read or write request for a cache line is received at the memory controller, the request is forwarded to the near memory controller 216 which determines the address of the cache line slot in near memory that the request's cache line's address maps to. If the address of the cache line slot that the requesting cache line maps to is listed in the FAL 222, a miss is declared at near memory (e.g., even if the cache line slot happens to have data resident in the near memory cache 213).

By forcing a miss at near memory, the request will next be directed to the far memory controller 221 so that the request can be serviced from far memory 214. If the request is a read request, the requested cache line will be read from far memory 214, or, if the request is a write request, the data that was appended with the request will be written into far memory 214.

According to nominal operation in the case of a read request (i.e., when the corresponding cache line slot is not listed in the FAL 222) and there is a miss at near memory, the requested cache line that is fetched from far memory 214 is not only sent from the memory controller 216 to the requesting CPU core, but is also written into near memory cache 213 (nominally, as a partial write into its corresponding cache line slot). However, after a cache-line's corresponding cache line slot has been listed in the FAL, the writing of the cache line that was just read from far memory into near memory cache may be disabled, or, such writing may be permitted to go forward, e.g., as a matter of system configuration which is specified in configuration register space.

Thus, to review, according to the design of the system of FIG. 2, rather than attribute some kind of failure to all far memory cache lines that are supported by an error prone cache line slot, instead, the address of the cache line slot is recorded in the FAL 222 of the near memory controller 220. Any subsequent requests that map to that cache line slot are then treated as if a miss has occurred in near memory cache 213 which re-directs the handling of the request to far memory 214. By effectively removing near memory service for any cache line whose address maps to the failing cache line slot, instead of attributing the failure to all system cache lines that are supported by the problematic cache line slot, any inadvertent amplification of the actual error rate within the memory system is avoided.

The implementation of lookup into the FAL 222 may vary from embodiment to embodiment. For example, according to one embodiment, the near memory controller 220 keeps a local cache that identifies which system cache lines that are currently being kept in near memory 213. For example, the local cache may list the tag portion of the address of the various system cache lines that are currently resident in near memory. Thus, determination whether an actual hit or miss has occurred in near memory is effected by referring to the local cache and comparing the tag that is listed in the local cache with the tag of the address of the incoming request.

In embodiments that retain such a local cache, look-ups into the local cache to determine whether an actual cache hit or cache miss has occurred in near memory may be performed before a look-up into the FAL 222, or, may be performed commensurate with a look-up into the FAL 222. If look-ups into the local cache are performed before look-ups into the FAL, note that the FAL 222 should be looked into each time a look-up into the local cache reveals a hit. If the look-up into the FAL 222 reveals the address of the cache line slot that is targeted by the request, no look-up into near memory 213 should occur even though the targeted system cache line is in near memory (instead a cache miss should be declared even though the look-up into the local cache has revealed a hit).

If look-ups into the local cache are performed commensurate with a look-up into the FAL 222, an access into near memory 213 should only happen if the look-up into the local cache reveals a hit into near memory and the look-up into the FAL 222 reveals that the targeted cache line slot is not listed in the FAL. In still other embodiments, a look-up into the FAL 222 may be performed before a look-up into the local cache. Here, a look-up into the local cache will not be performed if the look-up into the FAL 222 reveals that the targeted cache line slot is listed on the FAL 222 (i.e., a miss is declared even if the targeted system cache line is resident in near memory and listed in the local cache).

Other embodiments may not have a local cache that identifies the system cache lines that are currently resident in near memory. In these systems, a read of near memory is performed in order to determine whether a cache hit or cache miss has occurred (e.g., in a direct mapped near memory cache, each cache line slot has additional space to keep the tag of the system memory address of the cache line that is stored in the cache line slot). In systems that do not have a local cache, a look-up into the FAL 222 may occur before or commensurate with the read into near memory 213. If the look-up into the FAL 222 is performed before the read into near memory 213 and the targeted cache line slot is listed in the FAL 222, the read into near memory can be squelched (not performed) because a miss is automatically declared in near memory 213. By contrast, if the look-up into the FAL 222 is performed commensurate with the read into near memory 213, and if the targeted cache line slot is identified in the FAL 222, the cache line that is read from near memory 213 is flushed and a miss is declared even if an actual hit has occurred.

Another feature of the system of FIG. 2 pertains to the behavior of the memory controller 216 once a cache line slot has been identified for listing in the FAL 222 to preserve data consistency. For example, if a system cache line that is currently being kept in a cache line slot that has been declared sufficiently error prone for listing in the FAL 222 is also dirty, the cached system cache line currently contains the latest information for the system cache line. As such, in an embodiment, if a dirty system cache line is currently being kept in a cache line slot that is declared sufficiently error prone for listing in the FAL 222, the dirty system cache line is effectively evicted from near memory 213 and written into far memory 214. If the system cache line is not dirty, its contents are not written back to far memory 214 and near memory caching for constituent system cache lines that are supported by the problematic cache line slot are effectively suspended.

According to nominal system operation, as discussed above, when a system cache line is read from far memory, a copy of the system cache line is written into near memory cache 213. However, in an embodiment, also as discussed above, the writing of the copy into near memory cache 213 is not performed if the corresponding cache line slot is identified in the FAL 222. As such, when the read request is initially received at the memory controller 216 and the near memory controller 220 recognizes that the cache line being requested maps to a cache line slot that is listed in the FAL 222, the memory controller will suspend any following write of a copy of the cache line into near memory 213.

As depicted in FIG. 2, the near memory controller 220 also keeps error tracking logic 223 to track errors on a cache line slot by cache line slot basis. In an embodiment, if a particular cache line slot crosses a specific error threshold (e.g., the number of times it yielded errors and/or the total number of errors that had to be corrected through ECC operations, per unit time or absolute), the cache line slot's address is registered in the FAL 222.

The error tracking logic 223 may further be designed to implement or assist sparing procedures within near memory 213 to replace some or all of the near memory resources that were used to implement a problematic cache line slot with spare, replacement near memory resources. For example, once a cache line slot has been listed on the FAL 222, the error tracking logic 223 may provide deeper statistics to memory replacement functionality as to which logic bits in the cache line slot and/or which storage cells in near memory exhibited the failures. With this information, a memory sparing function can then proceed to replace, e.g., the memory cells in near memory that were used to implement the cache line slot with replacement cells.

The FAL 222 may be implemented with embedded register and/or memory space. The error tracking logic 223 may be implemented with dedicated hardware logic circuitry, programmable logic device circuits (e.g., PLD or PLA circuits), controller or processor logic circuitry that executes program code (e.g., software or firmware) or some combination of any of these.

Figure 3:
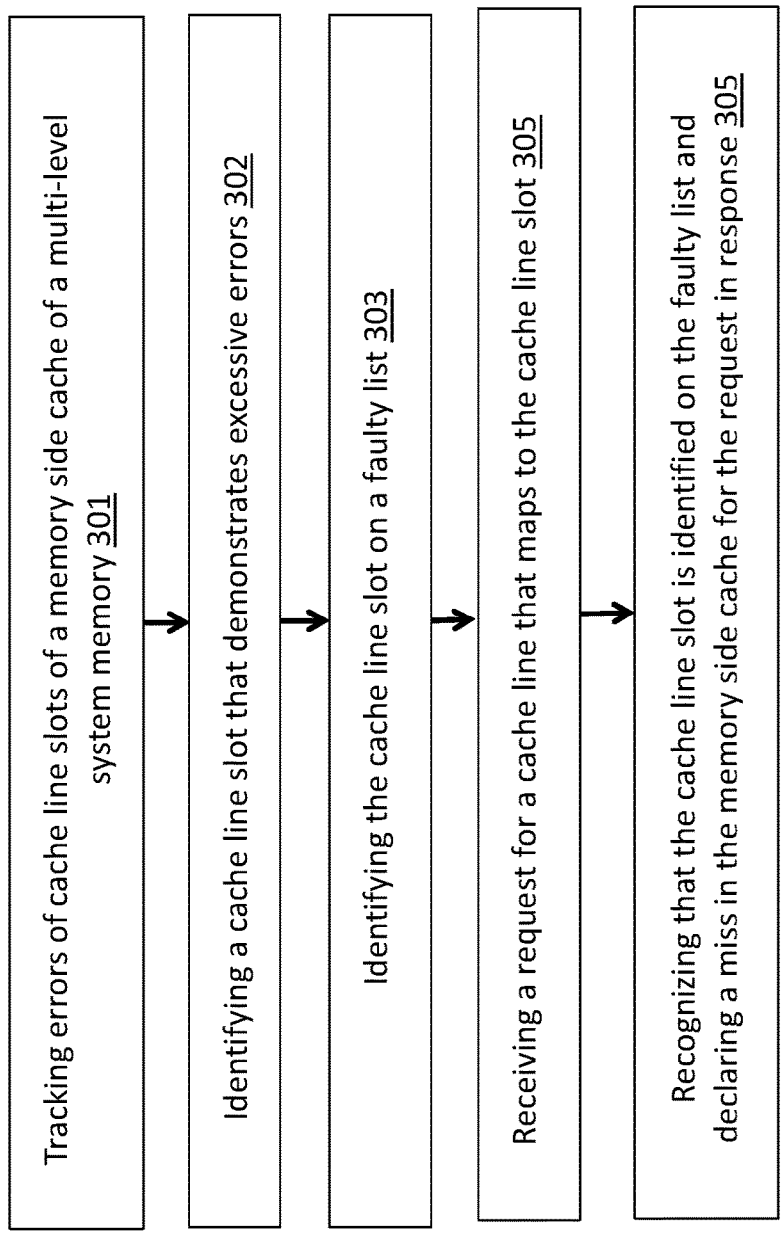
FIG. 3 shows a methodology performed by the improved system memory controller of FIG. 2.

FIG. 3 shows a method performed by a memory controller as described above. According to the methodology of FIG. 3, tracking errors of cache line slots of a memory side cache of a multi-level system memory 301. The method also includes identifying a cache line slot that demonstrates excessive errors 302. The method also includes identifying the cache line slot on a faulty list 303. The method also includes receiving a request for a cache line that maps to the cache line slot 304. The method also includes recognizing that the cache line slot is identified on the faulty list and declaring a miss in the memory side cache for the request in response 305.

3.0 Computing System Embodiments

Figure 4:
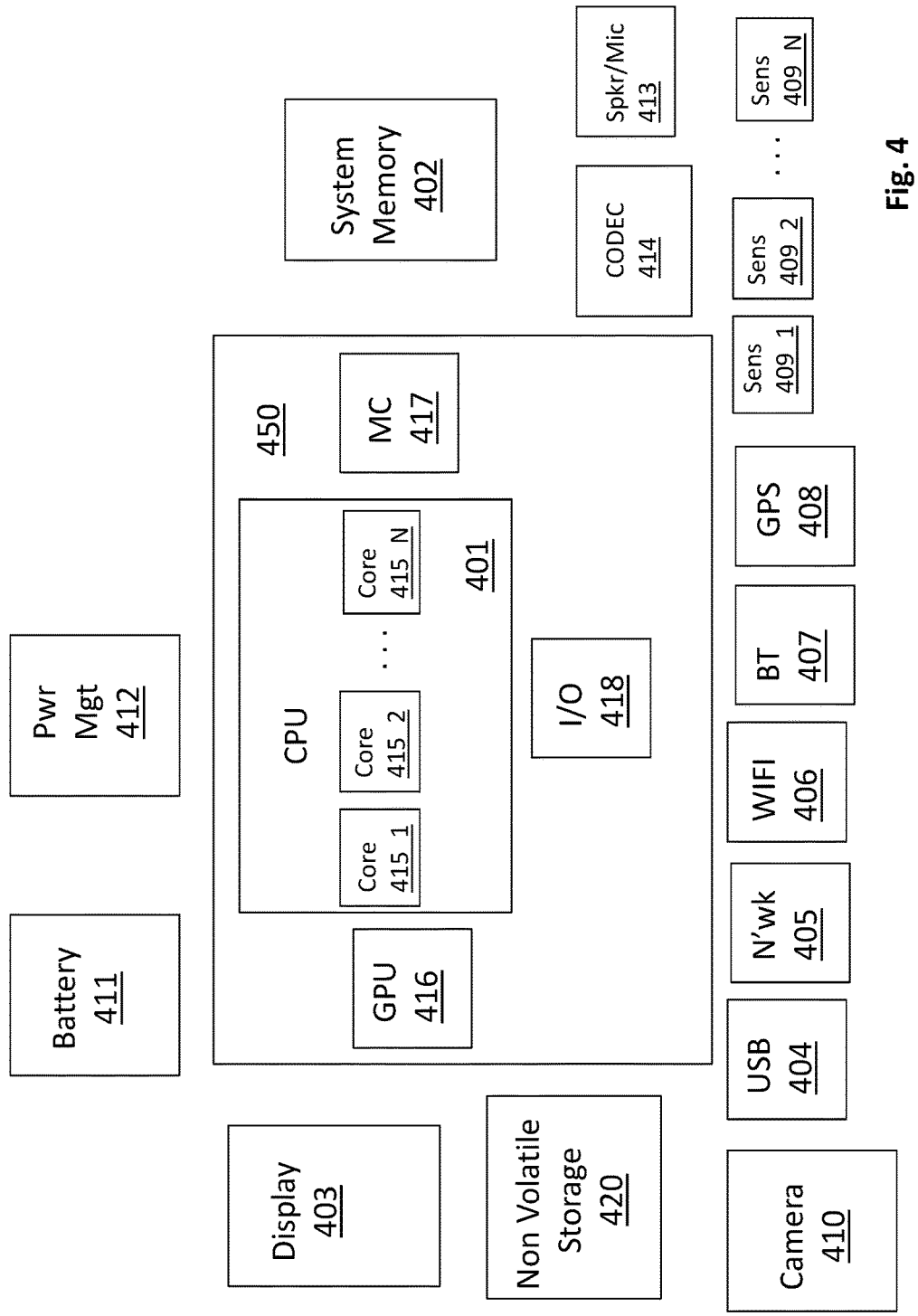
FIG. 4 shows a computing system.

FIG. 4 shows a depiction of an exemplary computing system 400 such as a personal computing system (e.g., desktop or laptop) or a mobile or handheld computing system such as a tablet device or smartphone, or, a larger computing system such as a server computing system. As observed in FIG. 4, the basic computing system may include a central processing unit 401 (which may include, e.g., a plurality of general purpose processing cores and a main memory controller disposed on an applications processor or multi-core processor), system memory 402, a display 403 (e.g., touchscreen, flat-panel), a local wired point-to-point link (e.g., USB) interface 404, various network I/O functions 405 (such as an Ethernet interface and/or cellular modem subsystem), a wireless local area network (e.g., WiFi) interface 406, a wireless point-to-point link (e.g., Bluetooth) interface 407 and a Global Positioning System interface 408, various sensors 409_1 through 409_N (e.g., one or more of a gyroscope, an accelerometer, a magnetometer, a temperature sensor, a pressure sensor, a humidity sensor, etc.), a camera 410, a battery 411, a power management control unit 412, a speaker and microphone 413 and an audio coder/decoder 414.

An applications processor or multi-core processor 450 may include one or more general purpose processing cores 415 within its CPU 401, one or more graphical processing units 416, a memory management function 417 (e.g., a memory controller) and an I/O control function 418. The general purpose processing cores 415 typically execute the operating system and application software of the computing system. The graphics processing units 416 typically execute graphics intensive functions to, e.g., generate graphics information that is presented on the display 403. The memory control function 417 interfaces with the system memory 402. The system memory 402 may be a multi-level system memory such as the multi-level system memory discussed at length above and include a near memory controller with a Faulty Address List.

Each of the touchscreen display 403, the communication interfaces 404-407, the GPS interface 408, the sensors 409, the camera 410, and the speaker/microphone codec 413, 414 all can be viewed as various forms of I/O (input and/or output) relative to the overall computing system including, where appropriate, an integrated peripheral device as well (e.g., the camera 410). Depending on implementation, various ones of these I/O components may be integrated on the applications processor/multi-core processor 450 or may be located off the die or outside the package of the applications processor/multi-core processor 450.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), digital signal processors (DSP), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
  memory controller logic circuitry to interface with a memory side cache of a multi-level system memory, said memory controller logic circuitry comprising error tracking circuitry to track errors of cache line slots in said memory side cache, said memory controller logic circuitry also comprising faulty list circuitry to store identifiers of faulty cache line slots that are deemed to be excessively error prone, said memory controller logic circuitry to declare a miss in said memory side cache for requests that map to cache line slots identified in said faulty list, said memory controller further comprising a local cache to identify cache lines kept in said memory side cache, wherein, said memory controller logic circuitry is to fetch a cache line from said memory side cache if it is identified in said local cache and its corresponding cache line slot is not identified on said faulty list.

2. The apparatus of claim 1 wherein said identifiers comprise addresses of faulty cache line slots.

3. The apparatus of claim 1 wherein said memory controller logic circuitry is further to write back a cache line resident in a faulty cache line slot to a far memory of the multi-level system memory if the resident cache line is dirty.

4. The apparatus of claim 1 wherein said memory controller logic circuitry is to prevent read data of a read request from being written into said memory side cache for a cache line that maps to faulty cache line slot and that was serviced from a far memory of the multi-level system memory that said memory side cache is a cache for.

5. The apparatus of claim 1 wherein said memory controller logic circuitry is further to not perform a read of a cache line from said memory side cache if its corresponding cache line slot is identified on said faulty list.

6. A computing system, comprising:
  a plurality of processing cores;
  a display;
  a multi-level system memory;
  memory controller logic circuitry to interface with a memory side cache of said multi-level system memory, said memory controller logic circuitry comprising error tracking circuitry to track errors of cache line slots in said memory side cache, said memory controller logic circuitry also comprising faulty list circuitry to store identifiers of faulty cache line slots that are deemed to be excessively error prone, said memory controller logic circuitry to declare a miss in said memory side cache for requests that map to cache line slots identified in said faulty list, said memory controller further comprising a local cache to identify cache lines kept in said memory side cache, wherein, said memory controller logic circuitry is to fetch a cache line from said memory side cache if it is identified in said local cache and its corresponding cache line slot is not identified on said faulty list.

7. The computing system of claim 6 wherein said identifiers comprise addresses of faulty cache line slots.

8. The computing system of claim 6 wherein said memory controller logic circuitry is further to write back a cache line resident in a faulty cache line slot to a far memory of the multi-level system memory if the resident cache line is dirty.

9. The computing system of claim 6 wherein said memory controller logic circuitry is to prevent read data of a read request from being written into said memory side cache for a cache line that maps to faulty line slot and that was serviced from a far memory of the multi-level system memory that said memory side cache is a cache for.

10. The computing system of claim 6 wherein said memory controller logic circuitry is further to not perform a read of a cache line from said memory side cache if its corresponding cache line slot is identified on said faulty list.

11. A method, comprising:
  tracking errors of cache line slots of a memory side cache of a multi-level system memory;

identifying a cache line slot that demonstrates excessive errors;

identifying said cache line slot on a faulty list;

receiving a request for a cache line that maps to said cache line slot;

recognizing that said cache line slot is identified on said faulty list and declaring a miss in said memory side cache for said request in response;

identifying cache lines kept in said memory side cache in a local cache;

fetching a cache line from said memory side cache if it is identified in said local cache and its corresponding cache line slot is not identified on said faulty list.

12. The method of claim 11 wherein said cache line slot is identified on said list by its address.

13. The method of claim 11 further comprising re-directing said request to a far memory of the multi-level system memory that said memory side cache acts as a cache for.

14. The method of claim 11 further comprising writing said cache line back to a far memory of the multi-level system memory that said memory side cache acts as a cache for because said cache line is resident in said memory side cache and is dirty.

\* \* \* \* \*